Patented Aug. 31, 1943

2,328,410

UNITED STATES PATENT OFFICE 2,328,410

CERAMIC INSULATING MATERIAL AND PROCESS FOR PRODUCING THE SAME

Godshalk Berge, Chicago, Ill., assignor to Johnson Laboratories, Inc., Chicago, Ill., a corporation of Illinois No Drawing. Application October 15, 1937, Serial No. 169,231

26 Claims. (Cl. 106—39)

This invention includes an improved process for producing a ceramic insulating material adapted particularly for use where a high dielectric constant and small power factor are required, for example, for high frequency apparatus, and for insulating radio apparatus, such as condensers, inductance coils, and for terminal blocks, and the like; the invention also includes the improved insulating material resulting from said process.

In carrying out the invention, compounds of magnesium, titanium, beryllium, aluminum and silicon are employed in different proportions, which, by the steps of treatment below described, produce different compositions of the insulating material of the invention, the raw materials preferably employed being magnesium oxide, titanium dioxide beryllium oxide, and beryl, the latter being a beryllium-alumina-silicate, all of said materials being preferably in finely powdered, dry and anhydrous condition when used.

The process of the invention includes first producing magnesium titanate, beryllium titanate or magnesium-beryllium titanate, depending upon the particular product later to be produced, and magnesium-beryllium-aluminate-silicate, and, for example, the magnesium titanate being conveniently produced by combining magnesium oxide and titanium dioxide or by combining magnesium hydroxide and titanic acid, the beryllium titanate by combining beryllium oxide and titanium dioxide, the magnesium-beryllium titanate by combining magnesium oxide, beryllium oxide and titanium dioxide, and the magnesium-beryllium-aluminate-silicate by combining magnesium oxide and beryl, all as below described.

The finished insulating material is produced by mixing and combining magnesium titanate with titanium dioxide and beryl or with magnesium-beryllium-aluminate-silicate, or by mixing and combining beryllium titanate with titanium dioxide and beryl or with magnesium-beryllium-aluminate-silicate, or by mixing and combining magnesium-beryllium titanate with titanium dioxide and beryl or magnesium-beryllium-aluminate-silicate, as below described. The resulting ceramic product is dense, non-porous and non-water-absorbent, and is adapted for use as insulators generally, and particularly for high frequency purposes, and has a high dielectric constant and a low power factor.

It has been proposed heretofore to produce insulating material consisting of magnesium titanate without combination with other substances, but it is found that the material so produced has a relatively low dielectric constant of about 17, although the power factor may be satisfactorily low, for example $1.5 \times 10^{-4}$. The insulating material produced by the present process is found to have a dielectric constant as high as 40 to 44 and a power factor as low as $1.7 \times 10^{-4}$.

The invention will be best understood from the following illustrative formulae and treatments which are included within the scope of the said invention:

Treatment No. 1

The production of the magnesium titanate for subsequent use, may conveniently be effected by combining magnesium oxide and titanium dioxide as follows:

| | Parts |
|---|---|
| Magnesium oxide (MgO) | 40 |
| Titanium dioxide ($TiO_2$) | 80 |

The constituents are intimately mixed and finely ground, after which the finely powdered mass is heated in a fireclay crucible at a temperature of at least 2550° F. for at least 5 hours. During this heating period the following chemical reaction takes place:

$$MgO + TiO_2 = MgTiO_3$$

Treatment No. 2

If preferred, the magnesium titanate may be produced at a lower temperature by combining magnesium hydroxide with titanic acid as follows:

| | Parts |
|---|---|
| Magnesium hydroxide ($Mg(OH)_2$) | 58 |
| Titanic acid ($H_2TiO_3$) | 98 |

The mixture of magnesium hydroxide and titanic acid is thoroughly mixed and finely ground, and the ground mixture is then heated in a fireclay crucible at a temperature less than 2550° F. for about 5 hours and during the heating period the following chemical reaction takes place:

$$Mg(OH)_2 + H_2TiO_3 = MgTiO_3 + 2H_2O$$

Treatment No. 3

To produce beryllium titanate for subsequent use, beryllium oxide and titanium dioxide may be combined as follows:

| | Parts |
|---|---|
| Beryllium oxide (BeO) | 25 |
| Titanium dioxide ($TiO_2$) | 80 |

The mixture is thoroughly mixed and finely ground, after which the mixture is heated in a fireclay crucible at a temperature of at least 2500°

F. for at least 5 hours and during the heating the following chemical reaction takes place:

$$BeO + TiO_2 = BeTiO_3$$

*Treatment No. 4*

To produce magnesium-beryllium titanate for subsequent use, magnesium oxide, beryllium oxide and titanium dioxide may be combined as follows:

| | Parts |
|---|---|
| Magnesium oxide (MgO) | 40 |
| Beryllium oxide (BeO) | 25 |
| Titanium dioxide (TiO$_2$) | 160 |

The mixture is thoroughly mixed and finely ground, after which the mixture is heated in a fireclay crucible at a temperature of at least 2500° F. for at least 5 hours and during the heating the following chemical reaction takes place:

$$MgO + BeO + 2TiO_2 = MgBe(TiO_3)_2$$

*Treatment No. 5*

To produce magnesium-beryllium-aluminate-silicate for subsequent use, magnesium oxide and beryl may be combined as follows:

| | Parts |
|---|---|
| Magnesium oxide (MgO) | 160 |
| Beryl (3BeO.Al$_2$O$_3$.6SiO$_2$) | 537 |

The mixture is thoroughly mixed and finely ground, and is then heated in a fireclay crucible at a temperature above 2200° F. for about 5 hours, and during the heating the two following chemical reactions take place:

$$4MgO + 3BeO.Al_2O_3.6SiO_2 = BeAl_2O_4 + 2BeSiO_3 + 4MgSiO_3$$

and $$4MgO + 3BeO.Al_2O_3.6SiO_2 = MgAl_2O_4 + 3BeSiO_3 + 3MgSiO_3$$

the resulting product in practice being a mixture of BeAl$_2$O$_4$, MgAl$_2$O$_4$, BeSiO$_3$ and MgSiO$_3$, that is, of beryllium aluminate, magnesium aluminate, beryllium silicate and magnesium silicate. This mixture is herein designated as magnesium-beryllium-aluminate-silicate.

*Treatment No. 6*

To produce one form of insulating material of the invention, magnesium titanate, titanium dioxide and beryl may be combined as follows:

| | Per cent |
|---|---|
| Magnesium titanate (MgTiO$_3$) | 30–35 |
| Anhydrous titanium dioxide (TiO$_2$) | 65–60 |
| Beryl (3BeO.Al$_2$O$_3$.6SiO$_2$) | 5 |

The constituents named should be dry and in finely powdered form and thoroughly mixed in the proportions stated, and the mixture should be very finely ground, for example in a ballmill for about 90 hours. The finely ground mixture may then be placed in molds and compressed under a pressure up to 25 tons per square inch, to form the desired articles, either with or without a binder, the product being somewhat stronger in its raw state where a binder is used. A satisfactory binder results from combining with the mixture, 5% of water containing 5% to 10% of gum arabic and thoroughly blending the binder with the mixture, before it is placed in the molds; other binders adapted to the purpose, may be used, if preferred.

The molded articles are then placed in soggers and heated in a kiln as follows:

They are first preheated for from 10 to 12 hours or more depending on the size of the articles, during which the temperature is raised gradually from room temperature to about 1700° F.; the articles are then fired for a period of about 15 hours, during which the temperature is raised from about 1700° F. to from 2225° F. to 2500° F., or to the sintering temperature of the material, which should not be exceeded, and the firing should be done in an oxidizing atmosphere; following the firing, the articles are cooled to room temperature in from 10 to 12 hours or more, depending on the size of the articles. It is important that the firing be done in an atmosphere that will not reduce the compounds, and while this may be effected either in a neutral or an oxidizing atmosphere, the latter is preferred to insure against the presence of a reducing atmosphere.

The resulting ceramic articles are finished products of the process, and besides having a high dielectric constant and low power factor, they are dense, non-porous, non-water-absorbent, and are found to have experienced a shrinkage due to the firing, of about 12 to 19% depending on the amount of binder used.

*Treatment No. 7*

To produce another insulating material of the invention, magnesium titanate, titanium dioxide and magnesium-beryllium-aluminate-silicate may be combined as follows:

| | Per cent |
|---|---|
| Magnesium titanate (MgTiO$_3$) | 30–35 |
| Anhydrous titanium dioxide (TiO$_2$) | 65–60 |
| Magnesium-beryllium-aluminate-silicate | 5 |

The constituents named are treated in the manner described in Treatment No. 6, to produce finished products of the process, which have characteristics of the kind described for the products of Treatment No. 6.

*Treatment No. 8*

To produce still another insulating material of the invention, beryllium titanate, titanium dioxide and beryl may be combined as follows:

| | Per cent |
|---|---|
| Beryllium titanate (BeTiO$_3$) | 30–35 |
| Anhydrous titanium dioxide (TiO$_2$) | 65–60 |
| Beryl (3BeO.Al$_2$O$_3$.6SiO$_2$) | 5 |

The constituents named are treated in the manner described in Treatment No. 6, to produce finished products of the process, which have characteristics of the kind described for the products of Treatment No. 6.

*Treatment No. 9*

To produce still another insulating material of the invention, beryllium titanate, titanium dioxide and magnesium-beryllium-aluminate-silicate may be combined as follows:

| | Per cent |
|---|---|
| Beryllium titanate (BeTiO$_3$) | 30–35 |
| Anhydrous titanium dioxide (TiO$_2$) | 65–60 |
| Magnesium-beryllium-aluminate-silicate | 5 |

The constituents named are treated in the manner described in Treatment No. 6, to produce finished products of the process, which have characteristics of the kind described for the products of Treatment No. 6.

*Treatment No. 10*

To produce still another insulating material of the invention, magnesium-beryllium titanate, titanium dioxide and beryl may be combined as follows:

| | Per cent |
|---|---|
| Magnesium-beryllium titanate (MgBe(TiO₃)₂) | 30–35 |
| Anhydrous titanium dioxide (TiO₂) | 65–60 |
| Beryl (3BeO.Al₂O₃.6SiO₂) | 5 |

The constituents named are treated in the manner described in Treatment No. 6, to produce finished products of the process, which have characteristics of the kind described for the products of Treatment No. 6.

Treatment No. 11

To produce still another insulating material of the invention, magnesium-beryllium titanate, titanium dioxide and magnesium-beryllium-aluminate-silicate may be combined as follows:

| | Per cent |
|---|---|
| Magnesium-beryllium titanate (MgBe(TiO₃)₂) | 30–35 |
| Anhydrous titanium dioxide (TiO₂) | 65–60 |
| Magnesium-beryllium-aluminate-silicate | 5 |

The constituents named are treated in the manner described in Treatment No. 6, to produce finished products of the process, which have characteristics of the kind described for the products of Treatment No. 6.

The firing of the molded material, which constitutes a part of each of Treatments Nos. 6 to 11 inclusive, chemically changes and combines its constituent materials to some degree without entirely involving them in such changes. As a result of the fired product including to a degree chemical compounds so formed, and also including to a degree a mixture of such compounds with chemically unchanged parts of said constituent materials, I am unable to state with certainty the chemical reactions produced by the said firing, or the exact chemical composition of the resulting fired products. For this reason, in certain of the claims below, I describe the claimed products by their original constituents and the proportions thereof.

In the several treatments above described, the prescribed parts and percentages of the constituent materials, are by weight. Where beryl is used, it is preferable to first wash it with hydrochloric acid and then dry it. All of the constituent materials should be dry, anhydrous and in finely powdered condition when used. In preparing the mixture of any of Treatments Nos. 6 to 11 inclusive, for molding and firing, the finer the mixture is ground and powdered, the better the resulting fired product will be for the purposes described; in this connection I find that satisfactory results are produced by grinding the mixture so that it will pass through a 500 mesh screen.

My tests with different proportions of the constituent materials, indicate that in producing the final products, particularly without the use of beryllium compound, increasing the percentage of the titanium dioxide from that prescribed, increases the dielectric constant of the final product, but also increases its power factor relatively and so rapidly that the advantage of the better dielectric constant is more than offset by the disadvantage of the poorer power factor, particularly for high frequency purposes; also, that decreasing the percentage of the titanium dioxide and increasing the percentage of magnesium titanate or magnesium-beryllium titanate as the case may be, decreases the power factor but also to a greater relative degree decreases the dielectric constant. I also find that magnesium-beryllium titanate is superior to magnesium titanate, as it produces a product having a considerably higher dielectric constant than magnesium titanate produces for the same power factor. I also find that the addition of beryllium compound, substantially decreases the power factor without decreasing the dielectric constant to the same extent proportionally, so that the magnesium-titanium-beryllium product has a high dielectric constant with a materially lower power factor than can be secured without the use of beryllium compound; also that the addition of beryllium compound closes the interstices of the finished product and makes the latter non-absorptive to moisture and at the same time increases the mechanical strength of the finished product.

The products produced by Treatments 6 to 11 above described, are similar as to their physical characteristics and show a range of dielectric constants of from 33 to 44 by test, the power factor by test ranging from $1.7 \times 10^{-4}$ to $2.5 \times 10^{-4}$.

In the illustrative treatments above described, I specify the proportions of parts my tests have shown to give the best results, but I do not limit myself specifically to such proportions, as I find that there may be substantial variation in the proportions specifically stated, without materially impairing the finished product for various uses, as to its dielectric constant and power factor. I therefore regard my invention as including any proportions of the constituent parts referred to, that will produce the improved product described.

By actual tests I find that the products described are much superior as to dielectric constant and power factor, to insulating materials similarly made in which compounds, for example, oxides, of thorium, tungsten, molybdenum, tin, silicon, aluminum, zinc and uranium, or compounds, for example oxides or borates, of barium and calcium are used singly or in combination.

I regard my invention as generically including the described processes of producing beryllium titanate, magnesium-beryllium titanate and magnesium-beryllium-aluminate-silicate as well as said products, whether used to produce said ceramic insulating material or not.

While I have shown my invention in the particular embodiment above described, it will be understood that I do not limit myself specifically to the exact steps of treatment or proportions described as I may employ equivalents without departing from the scope of the appended claims.

Having thus described my invention, what I claim is:

1. The process of producing ceramic insulating material, including mixing powdered magnesium-beryllium titanate, titanium dioxide and beryl in substantially the proportions of respectively 30 to 35 per cent, 65 to 60 per cent and 5 per cent, finely grinding the mixture, molding the mixture under pressure with an intermixed binder, and firing the molded mixture.

2. The process of producing ceramic insulating material, including mixing powdered magnesium-beryllium titanate, titanium dioxide and magnesium-beryllium-aluminate-silicate in substantially the proportions of respectively 30 to 35 per cent, 65 to 60 per cent and 5 per cent, finely grinding the mixture, molding the mixture under pressure, and firing the molded mixture.

3. The process of producing ceramic insulating material, including mixing powdered magnesium-beryllium titanate, titanium dioxide and magnesium-beryllium-aluminate-silicate in substantially the proportions of respectively 10 to 35 per cent, 65 to 60 per cent and 5 per cent, finely grinding the mixture, molding the mixture under pressure with an intermixed binder, and firing the molded mixture.

4. A ceramic material including in combination magnesium titanate, titanium dioxide and a portion at most of the order of 5% of a beryllium compound.

5. A ceramic insulating material including about 30 to 35% of magnesium titanate, about 60 to 65% of titanium dioxide and not to exceed approximately 5% of beryl.

6. A ceramic insulating material including about 30 to 35% of magnesium titanate, about 60 to 65% of titanium dioxide and not to exceed approximately 5% of magnesium beryllium aluminate silicate.

7. A ceramic insulating material including about 30 to 35% of magnesium titanate, about 60 to 65% of titanium dioxide and not to exceed approximately 5% of a beryllium compound.

8. A ceramic insulating material including as its constituents at least 50% of titanium dioxide, a substantially smaller proportion of magnesium titanate, and a beryllium compound in the proportion of not to exceed approximately 5%.

9. A ceramic insulating material including magnesium titanate and titanium dioxide, and a silicate of beryllium in the proportion of not to exceed approximately 5% and producing in the product a dielectric constant of at least 33 and a power factor not greater than $2.5 \times 10^{-4}$.

10. A ceramic material including in combination magnesium titanate, titanium dioxide and a portion at most of the order of 5% of beryl.

11. The process of producing ceramic insulating material, including mixing in powdered condition, substantially 30–35% of a titanate selected from the group consisting of magnesium titanate, beryllium titanate, and magnesium-beryllium titanate, substantially 65–60% of titanium dioxide, and not to exceed approximately 5% of beryl, finely grinding the mixture, molding the mixture under pressure, and firing the molded mixture.

12. The process of producing ceramic insulating material, including mixing in powdered condition, substantially 30–35% of a titanate selected from the group consisting of magnesium titanate, beryllium titanate, and magnesium-beryllium titanate, substantially 65–60% of titanium dioxide, and not to exceed approximately 5% of magnesium-beryllium-aluminate-silicate, finely grinding the mixture, molding the mixture under pressure, and firing the molded mixture.

13. The process of producing ceramic insulating material, including mixing in powdered condition, substantially 30–35% of a titanate selected from the group consisting of magnesium titanate, beryllium titanate, and magnesium-beryllium titanate, substantially 65–60% of titanium dioxide, and not to exceed approximately 5% of a silicate of beryllium, finely grinding the mixture, molding the mixture under pressure, and firing the molded mixture.

14. The process of producing ceramic insulating material, including mixing in powdered condition at least 50% of titanium dioxide, a substantially smaller proportion of a titanate selected from the group consisting of magnesium titanate, beryllium titanate, and magnesium-beryllium titanate, and not to exceed approximately 5% of beryl, finely grinding the mixture, molding the mixture under pressure, and firing the molded mixture.

15. The process of producing ceramic insulating material, including mixing in powdered condition at least 50% of titanium dioxide, a substantially smaller proportion of a titanate selected from the group consisting of magnesium titanate, beryllium titanate, and magnesium-beryllium titanate, and not to exceed approximately 5% of magnesium-beryllium-aluminate-silicate, finely grinding the mixture, molding the mixture under pressure, and firing the molded mixture.

16. The process of producing ceramic insulating material, including mixing in powdered condition at least 50% of titanium dioxide, a substantially smaller proportion of a titanate selected from the group consisting of magnesium titanate, beryllium titanate, and magnesium-beryllium titanate, and not to exceed approximately 5% of a silicate of beryllium, finely grinding the mixture, molding the mixture under pressure, and firing the molded mixture.

17. The process of producing ceramic insulating material, including mixing in powdered condition, substantially 30–35% of a titanate selected from the group consisting of magnesium titanate, beryllium titanate, and magnesium-beryllium titanate, substantially 65–60% of titanium dioxide, and not to exceed approximately 5% of a silicate of beryllium, finely grinding the mixture, molding the mixture under pressure with an intermixed binder, and firing the molded mixture.

18. The process of producing ceramic insulating material, including mixing in powdered condition at least 50% of titanium dioxide, a substantially smaller proportion of a titanate selected from the group consisting of magnesium titanate, beryllium titanate, and magnesium-beryllium titanate, and not to exceed approximately 5% of a silicate of beryllium, finely grinding the mixture, molding the mixture under pressure with an intermixed binder, and firing the molded mixture.

19. A ceramic insulating material including in combination at least 50% of titanium dioxide, a substantially smaller proportion of a titanate selected from the group consisting of magnesium titanate, beryllium titanate, and magnesium-beryllium titanate, and not to exceed approximately 5% of beryl.

20. A ceramic insulating material including in combination at least 50% of titanium dioxide, a substantially smaller proportion of a titanate selected from the group consisting of magnesium titanate, beryllium titanate, and magnesium-beryllium titanate, and not to exceed approximately 5% of magnesium-beryllium-aluminate-silicate.

21. A ceramic insulating material including in combination at least 50% of titanium dioxide, a substantially smaller proportion of a titanate selected from the group consisting of magnesium titanate, beryllium titanate, and magnesium-beryllium titanate, and not to exceed approximately 5% of a silicate of beryllium.

22. A ceramic insulating material including in combination titanium dioxide, a titanate selected from the group consisting of magnesium titanate, beryllium titanate, and magnesium-beryllium titanate, and not to exceed approximately 5% of beryl.

23. A ceramic insulating material including in combination titanium dioxide, a titanate selected from the group consisting of magnesium titanate, beryllium titanate, and magnesium-beryllium titanate, and not to exceed approximately 5% of magnesium-beryllium-aluminate-silicate.

24. A ceramic insulating material including in combination titanium dioxide, a titanate selected from the group consisting of magnesium titanate, beryllium titanate, and magnesium-beryllium titanate, and not to exceed approximately 5% of a silicate of beryllium.

25. A ceramic insulating material including in combination at least 50% of titanium dioxide, a substantially smaller proportion of a titanate selected from the group consisting of magnesium titanate, beryllium titanate, and magnesium-beryllium titanate, not to exceed approximately 5% of a silicate of beryllium, and an intermixed binder.

26. A ceramic insulating material including in combination titanium dioxide, a titanate selected from the group consisting of magnesium titanate, beryllium titanate, and magnesium-beryllium titanate, not to exceed approximately 5% of a silicate of beryllium, and an intermixed binder.

GODSHALK BERGE.

CERTIFICATE OF CORRECTION.

Patent No. 2,328,410.                                               August 31, 1943.

GODSHALK BERGE.

It is hereby certified that error appears in the printed specification of the above numbered patent requiring correction as follows: Page 1, first column, line 18, after "dioxide" insert a comma; page 4, first column, line 4, claim 3, for "10 to 35" read --30 to 35--; and that the said Letters Patent should be read with this correction therein that the same may conform to the record of the case in the Patent Office.

Signed and sealed this 9th day of November, A. D. 1943.

(Seal)
Henry Van Arsdale,
Acting Commissioner of Patents.